United States Patent [19]

Mayr et al.

[11] 3,768,893
[45] Oct. 30, 1973

[54] AUTOMATIC DIAPHRAGM CONTROL CIRCUIT FOR A MOTION PICTURE CAMERA

[75] Inventors: Helmut Mayr, Taufkirchen; Theodor Huber; Richard Pelte, both of Munchen, all of Germany

[73] Assignee: Agfa-Gevaert AG, Leverkusen, Germany

[22] Filed: Sept. 25, 1972

[21] Appl. No.: 291,606

[30] Foreign Application Priority Data
Sept. 24, 1971 Germany.................. P 21 47 679.9

[52] U.S. Cl.................................. 352/91, 352/141
[51] Int. Cl. ............................................. G03b 21/36
[58] Field of Search.............................. 352/91, 141

[56] References Cited
UNITED STATES PATENTS
3,419,325  12/1968  Mayr et al. ........................... 352/91
3,623,989  11/1971  Mayr et al. ........................... 352/91
3,672,753   6/1972  Nobusawa............................ 352/91
3,701,594  10/1972  Keiner ................................. 352/91

*Primary Examiner*—Samuel S. Matthews
*Assistant Examiner*—Russell F. Adams, Jr.
*Attorney*—Michael S. Striker

[57] ABSTRACT

A bistable circuit is connected between the film transport motor and the diaphragm control circuit and causes a rapid diaphragm closing when the motor is standing still. Activation of the motor causes automatic opening of the diaphragm to the correct position determined by ambient light conditions. The diaphragm is closed at a slower rate when the diaphragm control switch is activated when the motor is running. A circuit for automatically stopping the motor when the aperture is closed is also provided.

17 Claims, 2 Drawing Figures

3,768,893

AUTOMATIC DIAPHRAGM CONTROL CIRCUIT FOR A MOTION PICTURE CAMERA

BACKGROUND OF THE INVENTION

This invention relates to motionpicture cameras having D.C. motors for driving the film transport and having diaphragm control circuits wherein the diaphragm is opened at an opening rate determined by a timing circuit and closed at a closing rate also determined by a timing circuit. In these motion picture cameras, the opening of the diaphragm depends upon the light received by a photosensitive element, for example a photoresistor. The opening of the diaphragm to the so determined position occurs automatically, prior to the activation of the film transport motor. It is thus not possible in the conventional cameras of the above-described type to have a relatively slow opening of the diaphragm (fade-in) during the film transport without first having a slow diaphragm closing (fade-out). This of course wastes a certain amount of film.

SUMMARY OF THE INVENTION

It is an object of the present invention to furnish a motion picture camera of the above-described type, wherein, however, it is possible to bypass the action of the timing circuit and effect a rapid closing of the diaphragm immediately prior to a desired fade-in. However, in the camera of the present invention, it should also be possible to effect the slow diaphragm closing when it is desired for yielding a fade-out effect.

The invention resides in a motion picture camera and comprises film transport means having an activated and an inactivated state. The motion picture camera further comprises diaphragm means and diaphragm control means connected between said film transport means and said diaphragm means for closing said diaphragm means at a first predetermined rate upon receipt of a diaphragm control signal when said film transport means are in said activated state and for closing said diaphragm means at a second predetermined rate substantially exceeding said first predetermined rate upon receipt of a diaphragm control signal when said film transport means are in said inactivated state.

Further, the present invention comprises activating means for switching said film transport means from said inactivated to said activated state upon external activation. The diaphragm control means then further comprise means for opening said diaphragm at a predetermined opening rate when said film transport means switch from said inactivated to said activated state. It is thus seen that with the present invention the fade-in occurs immediately upon activation of the film transport means and is not preceded by a slow fade-out.

In the present invention, as in conventional motion picture cameras of the type described above, the film transport means comprise an electromotor and the diaphragm control means comprise a photosensitive element such as a photoresistor which controls the diaphragm aperture by means of controlling the current through a moving-coil instrument which is coupled to said diaphragm means. The timing circuit means for effecting the fade-in and fade-out comprise a timing circuit transistor which has an emitter-collector circuit connected in parallel with said photoresistor. In accordance with the present invention, bistable circuit means are connected between the electromotor means and the timing transistor. One input of said bistable circuit means is connected to the diaphragm control signal furnishing means, namely an externally activated switch. Activation of said switch, in the presence of a stopped motor, causes the bistable circuit means to apply a signal to the base of the timing transistor means which causes the timing transistor means to become fully conductive, thereby furnishing maximum current through said moving-coil means. Maximum current through said moving-coil means causes a closure of the diaphragm.

In a preferred embodiment of the present invention the output of said bistable circuit means has connected thereto a diode to prevent the unwanted polarity output from influencing the timing circuit.

The bistable circuit means in accordance with the present invention may either be a two-transistor flip-flop or a thyristor-tetrode.

In a preferred embodiment of the present invention an emitter resistor is connected in the emitter-collector circuit of said timing transistor. In order to stop the electromotor automatically when the diaphragm is fully closed, a Schmitt trigger is connected between the said emitter resistor and the motor activating circuit. The threshold of the Schmitt trigger circuit is set to correspond to the maximum voltage across the emitter resistor. When this maximum voltage is present, the Schmitt trigger circuit furnishes a trigger signal to a transistor in the motor activating circuit, thereby blocking said transistor which in turn, through a relay, disconnects the motor from the battery, thereby stopping said motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
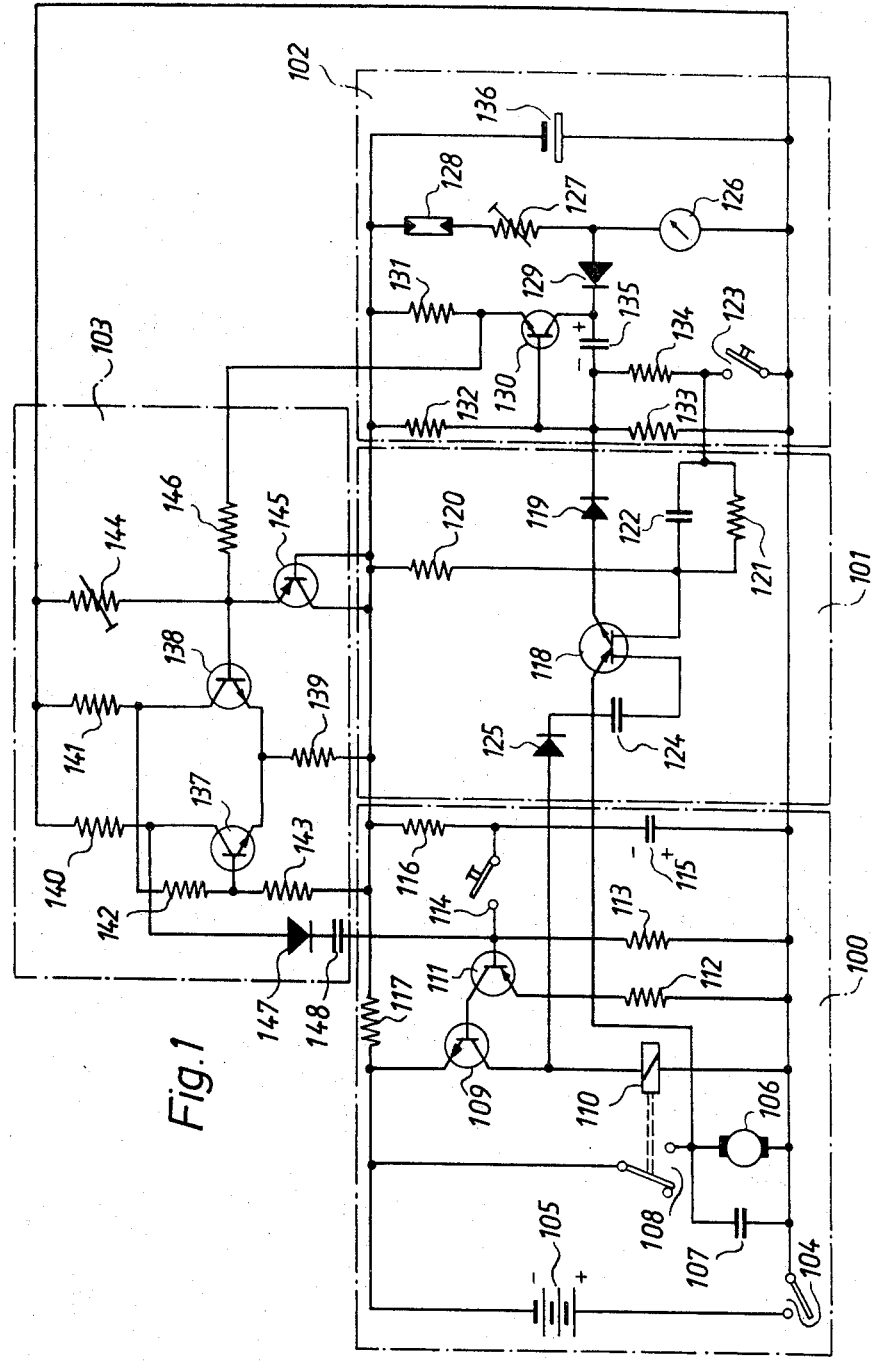
FIG. 1 is a circuit diagram of a first embodiment of the present invention.

Preferred embodiments of the present invention will now be described with reference to the drawing.

The first embodiment of the present invention is shown in FIG. 1. In FIG. 1, reference numeral 100 refers to the film transport means as well as the activating circuit therefor. Reference numerals 101 and 102 refer to the diaphragm control means, and reference numeral 101 specifically refers to bistable circuit means, while reference numeral 102 refers to the electromechanical means controlling the diaphragm and the associated photosensitive and timing circuits. Reference numeral 103 refers to a Schmitt trigger circuit.

A switch 104 connects the positive side of a source of energy, here a battery 105, to a D.C. motor 106, one embodiment of electromotor means. A capacitor 107 is connected in parallel with motor 106. The negative side of battery 105 is connected to the other side of motor 106 through relay contacts 108. Relay contacts 108 are operable by means of a relay 110 connected in the collector circuit of activating transistor means, here a transistor 109. The emitter of transistor 109 is directly connected to the negative side of the battery, while its base is connected to the collector of a transistor of opposite conductivity type 111. The emitter of transistor 111 is connected through a resistor 112 to the positive line. The base of transistor 111 is also connected to the positive line through a resistor 113. A capacitor 115 may be connected in parallel with resistor 113 through closing of the activating switch means, here a switch 114. A resistor 116 is connected in parallel with capacitor 115. A protective resistor is designated by reference numeral 117.

The bistable circuit means comprise a thyristor-tetrode 118 having a first main electrode connected to the common point of motor 106 and relay contacts 108, a first control electrode connected to the collector of transistor 109 through a capacitor 124 and a rectifier 125, a second main electrode connected to the anode of a diode 119, and a second control electrode connected to the voltage divider tap of a voltage divider comprising resistors 120 and 121. One terminal of resistor 120 is connected to the common point of resistors 117 and 116, one terminal of resistor 121 is connected to the diaphragm control signal furnishing means, here a switch 123, and resistor 121 has a capacitor 122 connected in parallel therewith. The other side of switch 123 is connected to the positive line, that is the line connectable to the positive side of battery 105 through switch 104.

Circuit block 102 of FIG. 1 comprises a moving-coil instrument 126 which controls the diaphragm opening and which is connected in series with a variable resistor 127 and a photoresistor 128. The moving-coil instrument 126 is connected through a diode 129 to the collector of a transistor 130 in whose emitter circuit an emitter resistor 131 is arranged. Transistor 130 is herein referred to as timing transistor means. The base of transistor 130 is connected to the tap of a voltage divider comprising resistors 132 and 133. Closure of the above-mentioned switch 123 causes a resistor 134 to be connected in parallel with resistor 133. A capacitor 135 is connected between the collector and base of transistor 130. The cathode of diode 119 is also connected to the base of transistor 130. The voltage for circuit 102 as well as for circuit 101 is derived from a stabilized cell 136 which is connected in parallel with battery 105 through protective resistor 117.

The Schmitt trigger 103 comprises two transistors, 137 and 138 in whose common-emitter circuit a resistor 139 is connected. The collector of transistor 130 is connected to the positive line through a resistor 140, while the collector of resistor 138 is connected to the positive line through a resistor 141. The collector of transistor 138 is connected to one extreme point of a voltage divider comprising resistors 142 and 143. To the voltage divider tap of said voltage divider is connected the base of transistor 137. The base of transistor 138 is connected to a voltage divider comprising a variable resistor 144 and the emitter-collector circuit of a transistor 145. The base and collector of transistor 145 are directly connected. The base of transistor 138 is further connected to the emitter of transistor 130 through a resistor 146. The collector of transistor 137 is connected through a diode 147 and a capacitor 148 to the base of transistor 111.

The above-described arrangement operates as follows:

Switch 104 is first closed, connecting battery 105 to the circuit. The diaphragm is then automatically opened to a position corresponding to the ambient light conditions through the current flowing through photoresistor 128 and variable resistor 127. Further, capacitor 135 starts to charge over a charging circuit including moving-coil instrument 126, diode 129 and resistor 132. Transistor 130 is blocked, so that no current flows through its emitter-collector circuit.

Closure of switch 123 causes a positive pulse to be applied to the second control electrode. This causes the thyristor-tetrode to become conductive. The base of transistor 135 is therefore connected through diode 119, thyristor-tetrode 118 and motor 106 to the positive pole of battery 105. Of course motor 106 in the stopped condition offers a low resistance. Thus, transistor 130 becomes immediately conductive which causes the diaphragm to be closed substantially instantaneously. Capacitor 135 discharges through the emitter-collector circuit of transistor 130 and resistors 131 and 132. Motor 106 of course remains in the inactivated, that is in the stopped position. Thus the positive pulse furnished by Schmitt trigger 103 upon full closure of the diaphragm (as will be described below) remains ineffective.

The operator of the motion picture camera next closes switch 114. The resultant negative voltage applied at the base of transistor 111 causes transistor 111 to become conductive. Base emitter current therefore flows through transistor 102 causing this also to become conductive. The current through the emitter-collector circuit of transistor 109 is sufficient to pull in relay coil 110 and therefore close contacts 108 energizing motor 106. Motor 106 thus begins to turn. Closing of contacts 108 also causes a negative pulse to be applied to the first main electrode of thyristor tetrode 118. Tetrode 118 therefore blocks. The negative pulse is not transmitted to the base of transistor 113 because of diode 119. After blocking of thyristor tetrode 118, a capacitor 135 which had previously discharged, slowly begins to charge thereby causing transistor 130 to block. The diaphragm therefore opens slowly. When transistor 135 is fully charged, the diaphragm is fully opened and transistor 130 is blocked.

If a fade-out is now desired, switch 123 is again closed. This causes transistor 130 to receive a slightly higher positive voltage at its base, causing it to become slowly conductive. Capacitor 135 starts to discharge again through the emitter-collector circuit of transistor 130 and resistors 131 and 132. After capacitor 135 is fully discharged and transistor 130 is fully conductive the voltage across emitter resistor 131 exceeds the threshold value of Schmitt trigger 103. Schmitt trigger 103 fires causing a positive pulse to be applied to the base of transistor 111. Transistor 111 blocks, in turn causing transistor 109 to block and relay contacts 108 to open. Motor 106 therefore stops. Blocking of transistor 109 causes a positive voltage to appear at its collector. This voltage is transmitted through diode 125 and capacitor 124 to the first control electrode of thyristor tetrode 118. Thyristor tetrode 118 remains blocked even through the first main electrode is now connected to the positive side of the battery. Switch 114 may of course now be opened.

If a new fade-in is now desired, switch 123 is again activated briefly. Since motor 106 is stopped, thyristor tetrode 118 again becomes fully conductive, as does transistor 130. The above-described cycle then recommences.

Figure 2:
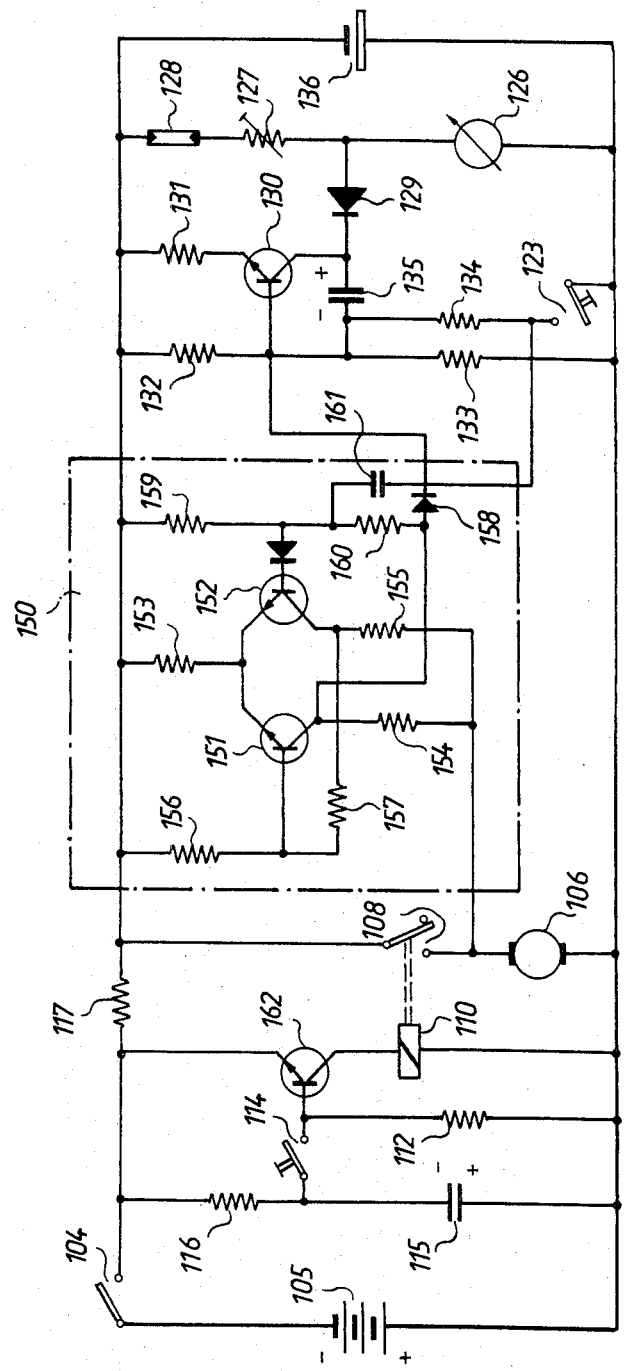
FIG. 2 is a second embodiment of the present invention.

The second embodiment of the present invention is shown in FIG. 2. Those elements which are the same in FIGS. 1 and 2 have the same reference numerals. The main difference between FIG. 1 and FIG. 2 is that the thyristor tetrode 118 has been replaced by a two transistor bistable stage 150. Bistable stage 150 comprises two transistors 151 and 152 which have a common emitter resistor 153. The collector resistor of transistor 151 is labelled 154, while the collector resistor of transistor 152 is labelled 155. A voltage divider comprising resistors 156 and 157 is connected to the collector of transistor 152. The base of transistor 151 is connected to the common point of resistors 156 and 157. The collector of transistor 151 is connected through a diode 158 to the base of transistor 130.

The collector of transistor 151 is connected to the negative side of the battery through a voltage divider comprising resistors 159 and 160. The common point of resistors 159 and 160 is connected through a diode 159a to the base of transistor 152. The common point of resistors 159 and 160 is also connected through a capacitor 161 to switch 123. The sides of collector resistors 154 and 155 which are not connected to the collectors of transistors 151 and 152 respectively are connected in common to the side of motor 106 which is connected to relay contacts 108. In the embodiment of FIG. 2, a single transistor 162 drives relay coil 110. Specifically, the emitter-collector circuit of transistor 162 is connected in series with the coil or relay 110. The base of transistor 162 is connected to the positive side of a battery through a resistor 112 and is further connected to one side of switch 114 whose other side is connected to the common point of a voltage divider comprising a capacitor 115 and a resistor 116. As in FIG. 1, battery 105 is connectable to the circuit through an operating switch 104.

The operation of the embodiment of the invention shown in FIG. 2 is substantially the same as that in FIG. 1. When motor 106 is standing still, the voltage across stabilized cell 136 serves as supply voltage to the bistable stage 150 as well as the remainder of the diaphragm control means. If switch 123 is closed, a positive pulse is applied to the base of input transistor 152. This causes transistor 152 to become conductive and transistor 151 to block. Blocking of transistor 151 causes the positive pulse generated at its collector to be applied to the base of transistor 130 which therefore becomes immediately highly conductive. Capacitor 135 discharges and the diaphragm is closed substantially instantaneously. When switch 114 is activated, relay 110 pulls in, activating motor 106. Closing of contacts 108 causes the bistable stage 150 to be short circuited. Therefore the negative potential of battery 105 is applied to diode 158 which blocks same from the base of transistor 130. Capacitor 135 starts to charge, blocking transistor 130. This causes a slow opening of the diaphragm as in the first embodiment. In order to achieve a fade-out, switch 123 must be reactivated.

The Schmitt trigger circuit which automatically stops the motor when the diaphragm is fully closed is not shown in FIG. 2.

While the invention has been illustrated and described as embodied in a circuit means for achieving a rapid diaphragm closing prior to a desired fade-in, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of the invention and, therefore, such adaptations should and are intended to be comprehended within the meaning and range of equivalence of the following claims.

What is claimed as new and desired to be protected by letters Patent is set forth in the appended

1. In a motion picture camera, in combination, film transport means having an activated and an inactivated state; diaphragm means; diaphragm control means connected to said film transport means and said diaphragm means for closing said diaphragm means at a first predetermined rate upon receipt of a diaphragm control signal when said film transport means are in said activated state and for closing said diaphragm means at a second predetermined rate substantially exceeding said first predetermined rate upon receipt of said diaphragm control signal when said film transport means are in said inactivated state; and diaphragm control signal furnishing means connected to said diaphragm control means, for furnishing said diaphragm control signal upon external activation.

2. A motion picture camera as set forth in claim 1, further comprising activating means for switching said film transport means from said deactivated to said activated state in response to external activation; and wherein said diaphragm control means further comprise means for opening said diaphragm means at a predetermined opening rate when said film transport means are switched from said inactivated to said activated state.

3. A motion picture camera as set forth in claim 2, further comprising deactivating means connected to said film transport means for deactivating said film transport means in response to a deactivation signal; and wherein said diaphragm control means comprise deactivation signal furnishing means furnishing said deactivation signal upon closure of said diaphragm means.

4. A motion picture camera as set forth in claim 2, wherein said diaphragm control means comprise photosensitive means furnishing a photosignal corresponding to the illumination falling thereon; electromechanical means responsive to said photosignal for opening and closing said diaphragm means in correspondence thereto; and timing circuit means connected to said photosensitive means for varying said photosignal as a function of time following receipt of said diaphragm control signal, in such a manner that said electromechanical means open and close said diaphragm means at said predetermined opening and first predetermined closing rates, respectively.

5. A motion picture camera as set forth in claim 4, wherein said timing circuit means comprise controllable variable impedance means connected in parallel with said photosensitive means.

6. A motion picture camera as set forth in claim 5, wherein said timing circuit means further comprise resistor-capacitor means connected to said variable impedance means for varying the impedance thereof.

7. A motion picture camera as set forth in claim 6, wherein said controllable variable impedance means comprise timing transistor means having an emitter-collector circuit connected in parallel with said photosensitive means, and a base.

8. A motion picture camera as set forth in claim 7, wherein said diaphragm control means comprise bistable circuit means connected to said film transport means and having a first stable state when said film transport means in said activated state and a second stable state when said film transport means is in said inactivated state; and first connecting means connecting said bistable circuit means to said timing transistor means in such a manner that said timing transistor means is fully conductive when said bistable circuit means is in said second stable state, whereby said electro-mechanical means close said diaphragm means at said second predetermined rate.

9. A motion picture camera as set forth in claim 8, wherein said first connecting means comprise diode means blocking signal transmission from said bistable circuit means to said timing transistor means when said bistable circuit means is in said first stable state.

10. A motion picture camera as set forth in claim 8, wherein said film transport means comprise electromotor means; and wherein said activating means comprise a source of energy; relay means having a relay coil, and relay contacts connecting said electromotor means to said source of energy when closed; activating switch means; and activating transistor means interconnected between said activating switch means and said relay coil for energizing said relay coil upon external activation of said activating switch means.

11. A motion picture camera as set forth in claim 10, wherein said bistable circuit means has a first input connected to said electromotor means, a second input connected to said diaphragm control signal furnishing means, and an output connected to said timing transistor means.

12. A motion picture camera as set forth in claim 11, wherein said bistable circuit means comprise two transistor bistable circuit means.

13. A motion picture camera as set forth in claim 11, wherein said bistable circuit means comprise thyristor-tetrode means.

14. A motion picture camera as set forth in claim 13, wherein said thyristor-tetrode means has a first main electrode constituting said first input, a second main electrode constituting said output, a first control electrode constituting said second input and a second control electrode connected to said relay coil.

15. A motion picture camera as set forth in claim 10, further comprising deactivating means for deactivating said electromotor means when said diaphragm means is closed.

16. A motion picture camera as set forth in claim 15, wherein said deactivating means comprise Schmitt trigger means interconnected between said timing circuit means and said activating means.

17. A motion picture camera as set forth in claim 16, wherein said timing circuit means comprise emitter resistor means connected in said emitter--collector circuit of said timing transistor means; and second connecting means for connecting the input of said Schmitt trigger means to said emitter resistor means of said timing circuit means and the output of said Schmitt trigger circuit means to said activating transistor means.

* * * * *